May 26, 1942.  C. F. BALL ET AL  2,284,251
CLUTCH SHIFTING MECHANISM
Original Filed Jan. 3, 1940   5 Sheets-Sheet 1

INVENTORS
Charles F. Ball and
Louis G. Hilkemeier;

ATTORNEY

May 26, 1942.  C. F. BALL ET AL  2,284,251
CLUTCH SHIFTING MECHANISM
Original Filed Jan. 3, 1940   5 Sheets-Sheet 4

INVENTORS
Charles F. Ball and
Louis G. Hilkemeier,
ATTORNEY

May 26, 1942.  C. F. BALL ET AL  2,284,251
CLUTCH SHIFTING MECHANISM
Original Filed Jan. 3, 1940   5 Sheets-Sheet 5

INVENTORS
Charles F. Ball and
Louis G. Hilkemeier,
ATTORNEY

Patented May 26, 1942

2,284,251

UNITED STATES PATENT OFFICE 2,284,251

CLUTCH SHIFTING MECHANISM

Charles F. Ball, Wauwatosa, and Louis G. Hilkemeier, Milwaukee, Wis., assignors to Chain Belt Company, Milwaukee, Wis., a corporation of Wisconsin Original application January 3, 1940, Serial No. 312,286. Divided and this application September 10, 1940, Serial No. 356,217

8 Claims. (Cl. 74—473)

This invention relates to clutch shifting mechanism and for purposes of the present disclosure it will be illustrated and described in connection with a power transmission unit for truck-mounted concrete mixers, of the type disclosed and claimed in our co-pending application Serial No. 312,286, filed January 3, 1940, entitled Power transmission unit, of which the present application is a division.

The apparatus claimed in said parent application comprises a unitary power transmission mechanism which may be substituted in a concrete mixing unit of the truck-mounted type for the separate motor which has heretofore been practically universally used to furnish the power for driving the mixing or agitating instrumentalities, whereby such power may be derived from the truck motor through a suitable power take-off. The construction of the said transmission unit is such that it may be substantially universally substituted for the separate motor without material change in the more or less standardized construction of the mixer unit, with the result that such mixer units may be furnished either with independent motor or for truck motor drive as occasion demands, at minimum cost.

The transmission unit includes a change-speed gearing of the constant mesh spur gear type, in which the speed changes are effected by means of a reciprocatable clutch member, and the clutch shifter of the present invention has been developed primarily for shifting such member, although as will be readily appreciated from the following disclosure it is not necessarily limited thereto. As suggested in said parent application, the change-speed gearing may conveniently be received and housed in an otherwise unused chamber in the housing of a double clutch-reversing-reduction gear unit of the type disclosed in the prior co-pending application of Louis G. Hilkemeier, Serial No. 267,284, filed April 11, 1939, although of course any other suitable housing might be employed.

It is the primary object of the present invention to provide an improved shifting mechanism for clutch members, such for example as the jaw or toothed clutch members of a change-speed gear set, which will yield temporarily should conditions exist at the time of initial engagement of the clutch elements which prevent full working engagement thereof.

A further object of the invention is to provide a clutch shifting mechanism which will automatically serve as a detent for retaining the clutch elements in full working engagement.

With the above and other objects in view, which will appear as the description proceeds, the invention consists in the novel details of construction, and in the novel combinations and arrangements of parts, more fully hereinafter disclosed and particularly pointed out in the appended claims.

Referring to the accompanying drawings forming a part of this specification, in which like reference characters designate like parts in all the views.

Figure 1:
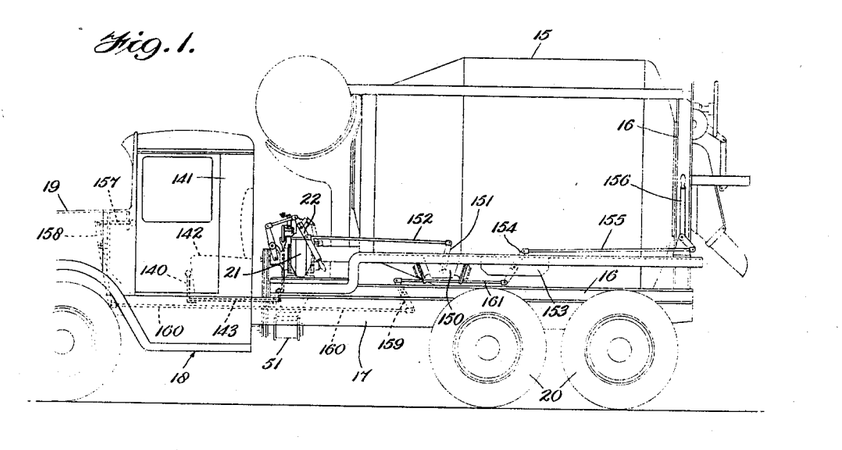
Figure 1 is a side elevational view, more or less diagrammatic, of a well known form of truck-mounted concrete mixer, having in the place of the usual separate engine one form of the power transmission unit of the said parent application Serial No. 312,286, in which is incorporated the clutch shifting mechanism of the present invention.

Referring more particularly to Figure 1, there is shown a truck mounted concrete mixer unit of a well known commercial form, comprising a drum 15 mounted for rotation about a longitudinal horizontal axis in a unit framework 16, which latter is mounted upon and secured to the frame members 17 of a motor truck 18 which is supplied with the usual gasoline or Diesel motor within the hood 19 and with the usual connections (not shown) for transmitting power therefrom to the rear wheels 20. Since the mixer units are adapted to be mounted upon all makes of motor truck, the precise construction of the latter may vary, and since it forms no part of the present invention, it has not been illustrated in detail.

Figure 2:
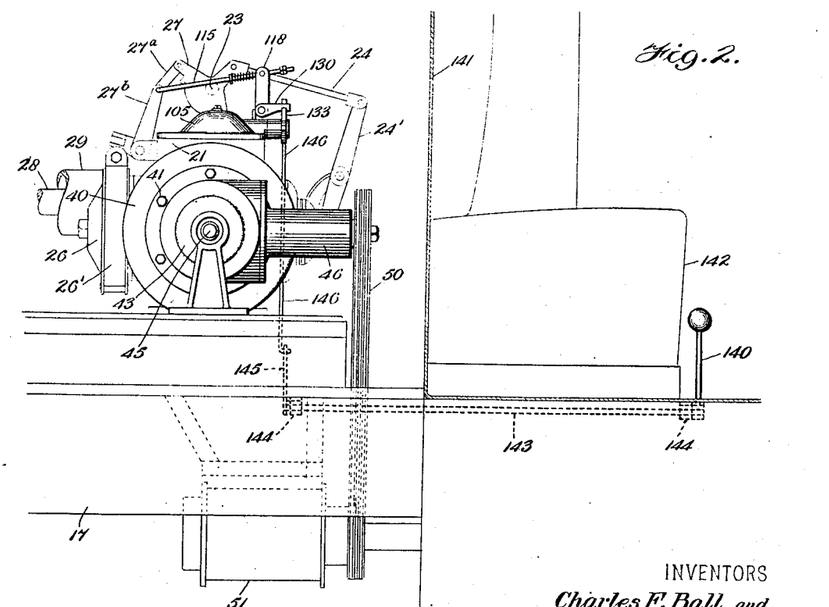
Fig. 2 is a somewhat enlarged fragmentary elevational view, partly in section, as seen from the opposite side of the machine shown in Fig. 1.
Figure 3:
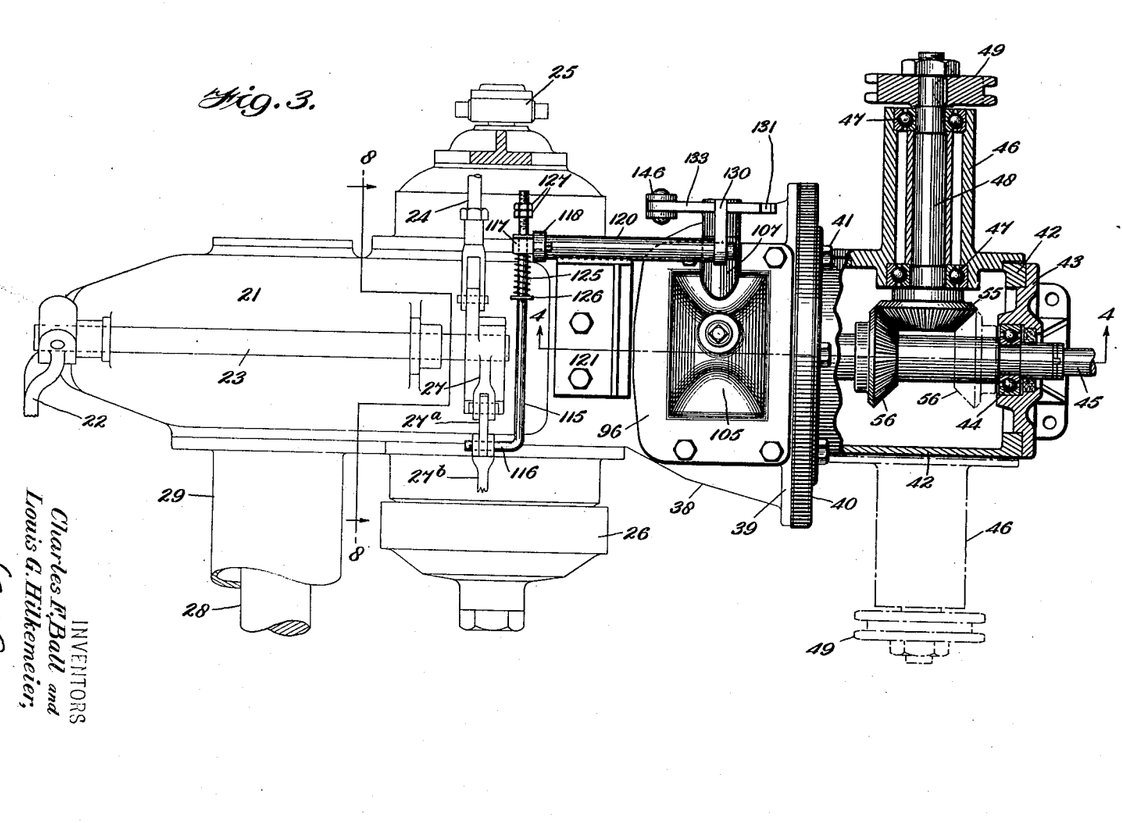
Fig. 3 is a top plan view on a still larger scale, partly broken away and in section, of the said transmission unit, associated with a double clutch-reversing-reduction unit of the type disclosed in the said Hilkemeier application Serial No. 267,284.

At the forward end of the frame 16 of the mixer unit there is mounted a transversely extending housing 21, see Figs. 1, 2 and 3, which contains a double clutch-brake-reversing and reduction gear mechanism of the type set forth in the said prior Hilkemeier application Serial No. 267,284. The details of that mechanism have not been here illustrated, but it may be said that the clutches are shifted to engage alternatively by means of a lever 22, rock shaft 23 and linkage 24 connected to a shifting fork 24' engaging with a shifting collar 25. The mechanism also includes a brake drum 26 having associated with it brake shoes 26' arranged to be controlled through linkage 27 from the rock shaft 23, whereby the brake will be applied when both clutches are disengaged to bring the drum 15 to an immediate stop and hold it throughout the clutch disengagement period. The reduction gearing of this unit drives a shaft 28 journalled in a tubular extension 29 of the housing 21, which through a chain and sprocket gearing mounted on the forward end of the drum 15, transmits power to the drum to rotate it.

Figures 4, 5:
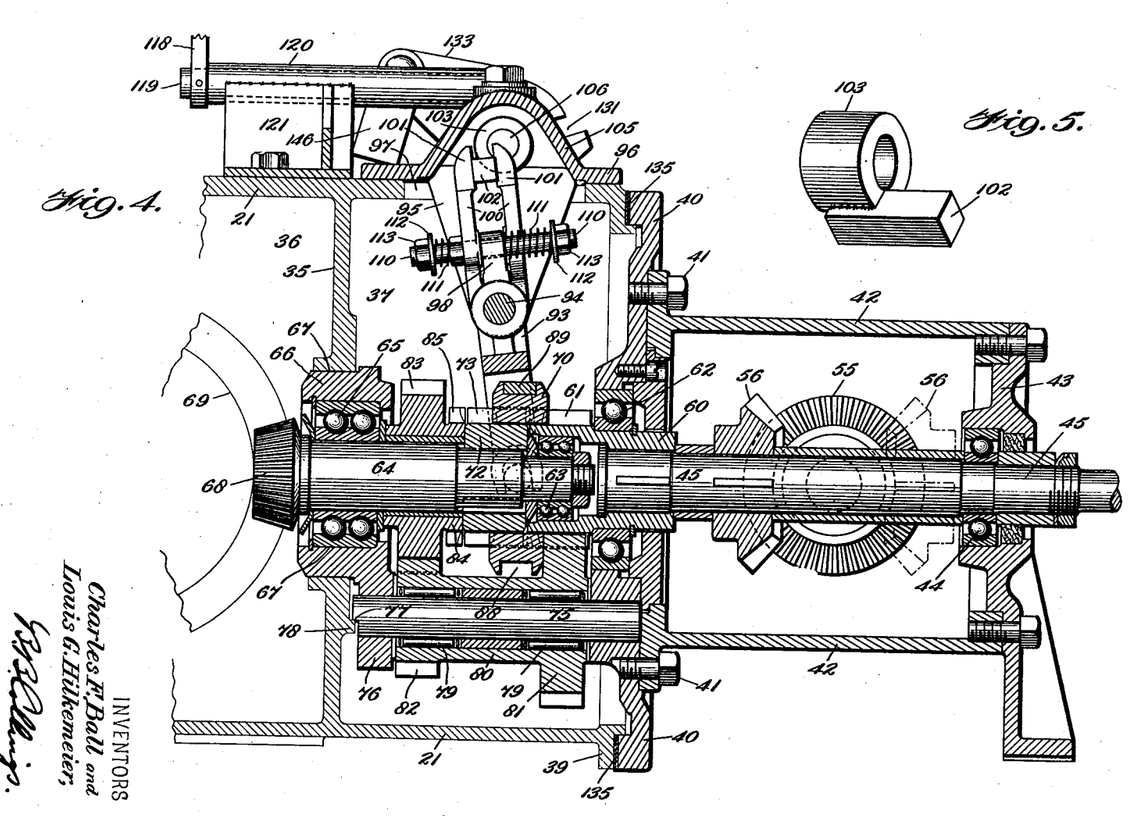
Fig. 4 is an enlarged longitudinal vertical sectional view through the transmission unit of said parent application, taken approximately on the plane indicated by the line 4—4 of Fig. 3, looking in the direction of the arrows, and illustrating the present clutch shifting mechanism incorporated therein; the change speed gearing being shown in the high speed position.
Fig. 5 is a detail perspective view of the actuating cam for the clutch shifting mechanism.
Figure 6:
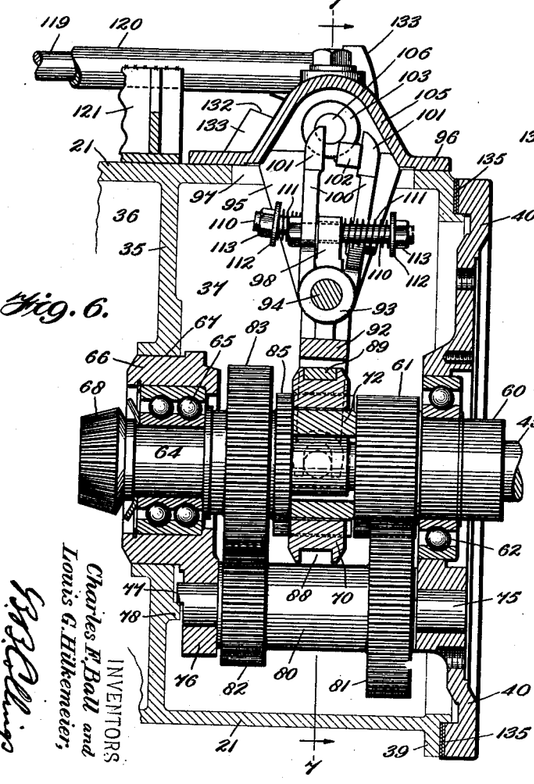
Fig. 6 is a view similar to Fig. 4 of the change-speed gearing, illustrating the possible yielding action of the shifting mechanism as a change is made from high to low gear.

As best shown in Figs. 4 and 6, the housing 21 is provided with a transverse partition wall 35 dividing it into two chambers 36 and 37, in the former of which the double clutch-reversing-reduction gear mechanism just referred to is mounted, while the chamber 37 in some instances of separate engine drive may house a main clutch. The walls of the housing surrounding the chamber 37 are expanded as indicated at 38 (Figs. 3 and 7) to a substantially bell shape, and the end of the housing is provided with a circular flange 39 which has heretofore been bolted to the fly-wheel housing of the separate engine.

With the use of the double clutch arrangement of the Hilkemeier application, or with the elimination of the separate engine, a clutch within the chamber 37 is not required, leaving this chamber available for other purposes, and the invention of said parent application Serial No. 312,286 contemplates a power transmission attachment for truck motor drive purposes which includes a change speed gear mechanism which may be introduced into and housed within the chamber 37 as it stands. The flange 39 of the housing 21 affords a ready means for the attachment thereto of a plate 40 which serves as a support for the truck motor drive unit now to be described.

As the standard power take-offs for truck motors usually embody a drive shaft the axis of which is longitudinal of the truck, i. e., parallel to the propeller shaft of the latter, and since the housing 21 and its reduction gearing are normally-mounted for the reception of power from a transversely mounted separate engine, the said attachment for truck motor drive preferably incorporates as a part thereof mechanism, such for example as bevel gearing, for transmitting power at right angles, from an axis longitudinal of the truck to an axis transverse thereof, said power after passing through the change speed mechanism of the attachment in chamber 37 being delivered to the reduction gearing and/or other mechanism in chamber 36, and transmitted by it to the drum 15 in the usual manner.

To this end, the plate 40, which as above indicated is arranged to be secured to the flange 39 of housing 21 in lieu of the fly-wheel housing of the separate engine, has secured to it by bolts 41 one end of an annular casing 42, the other end of which is closed by an end plate 43, carrying a ball or other bearing 44 for journalling one end of a shaft 45, see Figs. 3 and 4. The axis of the casing 42 and shaft 45 is transverse to the longitudinal axis of the mixer unit and of the truck on which it is mounted, and carried by and extending at right angles from the said casing, with its axis in substantial parallelism with said longitudinal axis of the truck and mixer unit, is a tubular extension 46 in which is journaled, as by ball bearings 47, an input shaft 48. This shaft carries at its outer end a sprocket or pulley 49 for engagement by a chain or belt 50, see Figs. 1 and 2, which is adapted to be driven by any suitable power take-off mechanism 51 deriving power from the truck motor in any usual manner.

The inner end of the shaft 48 carries a bevel gear 55 which meshes with a companion gear 56 carried by the shaft 45, see Figs. 3 and 4. Since as indicated in the said parent application Serial No. 312,286, the drive shaft of the power take-off 51 in some cases rotates in one direction and in some cases in the opposite direction, the gear 56 will be mounted on the shaft 45 in assembly either in the position shown in full lines or the position shown in broken lines in these figures, depending upon the direction of rotation of the input shaft 48, whereby the shaft 45 will always be driven in the same direction.

The inner end of the shaft 45 is received in and keyed to the hub 60 of a gear 61 constituting a portion of the change speed mechanism of the attachment, the said hub being journalled in a ball or other bearing 62 mounted in the attaching and supporting end plate 40. The gear 61 is recessed internally for the reception of a ball bearing 63 which journals one end of the output shaft 64 of the unit, the other end of which is journaled in a ball or other bearing 65 mounted in a bearing housing member 66 which is slidably received in an aperture 67 with which the intermediate partition wall 35 of housing 21 is normally provided. Beyond the bearing 65 the output shaft 64 carries a bevel pinion 68 arranged to mesh with one or more bevel gears 69 of the reversing and/or reduction gear unit in chamber 36.

The change speed gear mechanism of the attachment unit is preferably of the constant mesh spur gear type, in which the connection between the driving and driven elements for the different speeds is accomplished by a sliding clutch member 70. This member is provided with internal teeth 71, see Fig. 7, equal in number and complementary to the teeth of the gear 61, and the said member 70 is slidably mounted upon a collar 72, keyed to an intermediate portion of the output shaft 64 and provided with external teeth 73, also equal in number and complementary to the teeth of the gear 61, with which it is axially alined. Thus, when the teeth of the gear 61 are circumferentially alined with the teeth of the collar 72, the clutch member 70 may be moved into overlapping power transmission engagement with the two, as illustrated in Fig. 4, thus providing a direct drive between the shafts 45 and 64 through the hub 60, gear 61, clutch member 70 and collar 72, as will be readily understood.

To provide a different and preferably a lower speed drive for the shaft 64, a countershaft 75 is mounted below the shaft 64, one end thereof being received in the plate 40 and the other end being received by an extension 76 of the bearing housing member 66, as will be clear from Figs. 4 and 6. This shaft 75 does not rotate, being restrained by a shoulder 77 on the last mentioned end thereof which longitudinally slidably engages a lug 78 formed on the intermediate partition wall 35. Journaled upon the countershaft 75 as by roller bearings 79 is a gear set comprising a sleeve 80 having at one end a gear 81 in constant mesh with the gear 61, and at its other end a smaller gear 82 which is in constant mesh with a gear 83 which is freely journaled upon the shaft 64. The gear 83, which is of larger diameter than the gear 61, has a hub 84 between itself and the clutch collar 72, which hub is provided with external teeth 85, equal in number and complementary to the teeth on the members 70 and 72. It thus results that when the teeth 85 and 73 are in complementary circumferential disposition the clutch member 70 may be slid toward the left from the position shown in Fig. 4 to one in which it provides a driving engagement between the gear 83 and the collar 72, whereupon the drive will be from shaft 45 through hub 60, gear 61, gear 81, sleeve 80, gear 82, gear 83, clutch member 70 and collar 72 to shaft 64. Since in the embodiment shown the gear 81 is larger than the gear 61, and the gear 83 is larger than the gear 82, the output shaft 64 will under these conditions be driven at a less speed than that of the shaft 45. In either the direct or the reduced speed drives, however, the shaft 64 will be driven in the same direction.

For shifting the clutch member 70, the following mechanism constituting the present invention is provided: The said member is provided with an exterior circumferential groove 88 in which is received a substantially semi-circular shifting yoke 89, there being a running fit between the two whereby the clutch member may freely rotate within the yoke. The latter carries a pair of diametrically opposed trunnions 90 which are received in slots 91 formed in the ends of the arms 92 of a shifting fork 93 which is pivotally mounted on the pin or shaft 94. The said shaft is carried by a pair of ears 95, here shown as formed integrally with a cap plate or member 96 which is secured on the top of housing 21 above the chamber 37. The ears 95 extend downwardly from the cap plate 96 through an opening 97 which is normally present in the top wall of housing 21.

Figure 7:
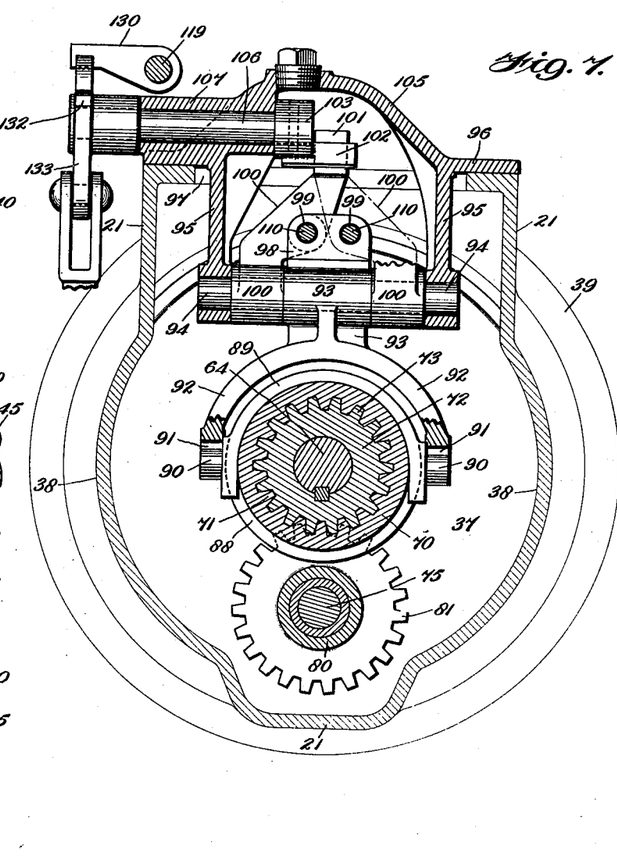
Fig. 7 is a transverse sectional view, taken approximately on the plane indicated by the line 7—7 of Fig. 6, looking in the direction of the arrows.

The shifting fork 93 is provided with a rigid upstanding lug 98 which is provided with a pair of transversely spaced apertures 99 therethrough, see Fig. 7. The said fork is mounted medially on the pin 94 and to either side thereof, between the fork hub and the ears 95, there is journaled an arm 100. As best seen in Fig. 7, these arms are offset inwardly so that their upper ends are in line, and the said upper ends are provided with pads 101, the inner faces of which embrace a square cam member 102 which is rigidly eccentrically carried by a hub 103. The cap plate 96 is crowned as at 105, and a rock shaft 106 is journaled in a bearing boss 107 extending from the said crown, the hub 103 of the cam member 102 being rigidly secured to the inner end of the said rock shaft 106.

As viewed in Figs. 4 and 6, the arms 100 are disposed one to either side of the lug 98 of the shifting fork, which they overlap and normally contact, and each arm carries a bolt 110 which freely passes through one of the apertures 99 in the said lug. A helical compression spring 111 surrounds each bolt 110 beyond the lug 98, the inner end of each spring bearing against an outer face of the lug, while the inner ends of said springs seat upon washers 112 backed by adjustment nuts 113 threaded on the free ends of the respective bolts 110. The springs 111 are preloaded through adjustment of the nuts 113 to an extent sufficient to partially restrain free movement between the arms 100 and the lug 98.

As will be clear from Fig. 4, when the clutch member 70 is in fully meshed power transmitting position as shown, the inner flat faces of the pads 101 of the said arms are in flat engagement with two opposite faces of the square cam member 102, which is arcuately displaced some 25° or more from the vertical plane of the axis of the rock shaft 106. In the course of a normal manual shift of the cam from this Fig. 4 position to that shown in Fig. 6, as the cam reaches the said vertical plane, instead of having two opposed faces presented to the complementary faces of the pads 101, it will have two opposite corners in engagement therewith, and since the diagonal of the square is longer than a side thereof, the arms 100 will have been spread somewhat against the pressure of the springs 111. When the cam passes the vertical plane it begins to present its other two opposed faces to the inner faces of the pads 101 and since the springs 111 are always tending to produce a flat contact between the pad and cam faces, they will tend to facilitate the completion of the shift.

When, as sometimes happens in the course of a shift, the teeth of the gear 61 of the hub 84 are not in meshing alinement with the teeth 71 of the clutch member 70, the sliding movement of the said member 70 will be temporarily arrested until such alinement results from the rotation of the gears 83 and 61. This condition is illustrated in Fig. 6 during a shift from high to low speed, and it will be observed that when it does occur, motion of the rock shaft 106, and cam member 102 is not arrested but continues to the normal limits thereof. This is permitted by the yielding of one of the arms 100, as for example the right hand one in Fig. 6, against the action of its spring 111, which is thus further compressed, as shown. The pressure exerted by this spring against the lug 98 is tending to move the shifting fork 93 in a clockwise direction, as viewed in the said figure, which is the direction necessary to complete the shift, and as soon as the teeth 74 and 85 are in meshing alinement, the said spring pressure acts to accomplish such meshing with a snap action. The ends of the intermeshing clutch teeth 85 and 74, and of the gear 61 may be beveled in accordance with common practice to facilitate such meshing.

The spring pressed arms 100 also serve as detents for retaining the clutch member 70 in either fully meshed position. For example, in the "high" position illustrated in Fig. 4, any tendency of the clutch member 70 to shift axially in either direction from the position shown tends to produce an arcuate movement of the cam 102 and shaft 106. However, such movement would destroy the flat face to face contact between the cam and the pads 101 and tend to bring the cam corners into engagement with the said pad faces, with a consequent spreading of the arms 100, which of course is resisted by the springs 11. It therefore results that while a shift from either speed to the other may be freely accomplished through the application of sufficient force, manual or otherwise, to the rock shaft 106 to overcome the preloading of the springs 111, accidental or unintentional shifting is prevented through the detent action just described.

When the transmission unit is employed with the double clutch-reversing gear mechanism of the said Hilkemeier application, it is preferred to provide an interlock between the two, whereby it is impossible to shift the clutch member 70 except when both clutches of the said Hilkemeier mechanism are disengaged. One example of such interlock is best illustrated in Figs. 3, 7, 8 and 9. In this form, the mechanism comprises a rod 115 having an angularly disposed end portion 116 which serves as a pivotal connection between the link 27ᵃ and the rock arm 27ᵇ of the brake control linkage 27. The free end of the rod 115 is freely slidable in a block 117 which is pivotally carried by the upper end of an arm 118, the lower end of which is rigidly carried by one end of a rock shaft 119 journaled in a bearing tube 120 mounted by a bracket 121 which is secured on the top surface of the housing 21. A compression spring 125 surrounds the rod 115 between one side of the block 117 and a stop washer 126 carried by the rod, and urges the said block and the arm 118 toward the full line position shown in Fig. 8. An adjustable stop, here shown in the form of lock nuts 127 threaded upon the rod 115, is provided to the other side of block 117, the said stop being so positioned on the rod as to provide for a certain amount of lost motion movement of the rod in the block.

The other end of the rock shaft 119 rigidly carries a dog 130, overlying the operating rock shaft 106 of the change speed gear mechanism above described, and oscillatable in the plane of the axis of said shaft 106. The free end of the said dog 130 is receivable in one or the other of the two notches or recesses 131 and 132 provided in a locking plate 133 which is rigidly carried by the rock shaft 106.

The operation of the interlocking mechanism just described is as follows: With the various parts in the full line positions shown in Figs. 3, 8 and 9, the control lever 22 of the double clutch-reversing mechanism is moved to neutral position, thereby moving the rock shaft 23 in a clockwise direction, as viewed in Fig. 8, and through the clutch control linkage 24 and shifting collar 25 throwing out the engaged clutch of the said mechanism. The same movement of the shaft 23 moves the link 27ᵃ of the brake control linkage 27 from the full line position shown in the said figure to the horizontal broken line position shown therein, thereby swinging the arm 27ᵇ to its broken line position and thus applying the brake shoes to the brake drum 26. This movement of the link 27ᵃ and arm 27ᵇ draws the rod 115 toward the right, as viewed in said Fig. 8, and during the first part of this movement the rod slides freely in the block 117, with the compression spring 125 expanding and maintaining the said block, the arm 118, the rock shaft 119 and the dog 130 in the full line positions. However, the stop 127 is so positioned upon the rod 115 that before the link 27ᵃ and arm 27ᵇ complete their movement to their broken line positions, the said stop engages the block 117, whereupon the further movement of the rod 115 serves to draw the arm 118 to its broken line position shown in Fig. 8, thereby rocking the shaft 119 and lifting the dog 130 to its broken line position, disengaging its free end from the notch 132 in the locking plate 133. The operating rock shaft 106 of the change speed gearing is now free to move and may be rocked to effect the shift of the clutch member 70 from engagement with the gear 161 to engagement with the teeth 85 of gear hub 84. This movement of the shaft 106 brings the notch 131 into alinement with the dog 130.

Figure 8:
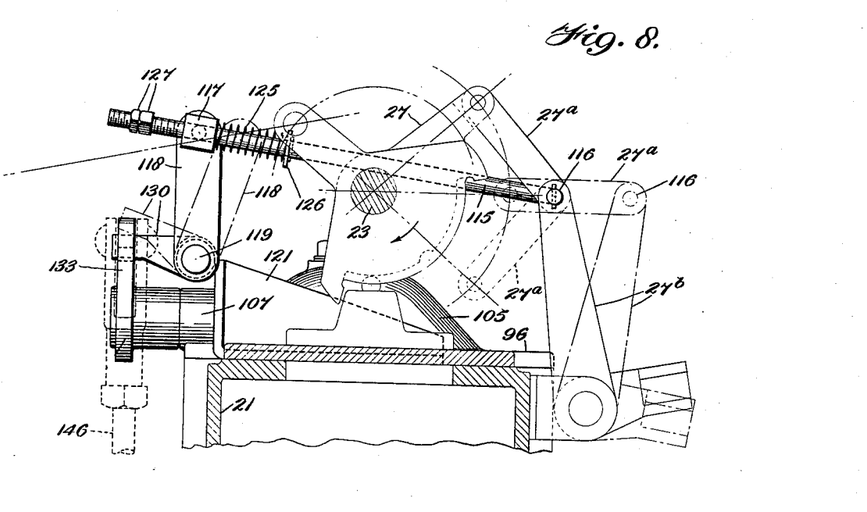
Fig. 8 is a partial cross sectional view, taken approximately on the plane indicated by the line 8—8 of Fig. 3, illustrating the essentials of the clutch and brake actuating mechanism for the double clutch-reversing apparatus of the said Hilkemeier application Serial No. 267,284 and showing an interlock between such mechanism and the change-speed controls.
Figure 9:
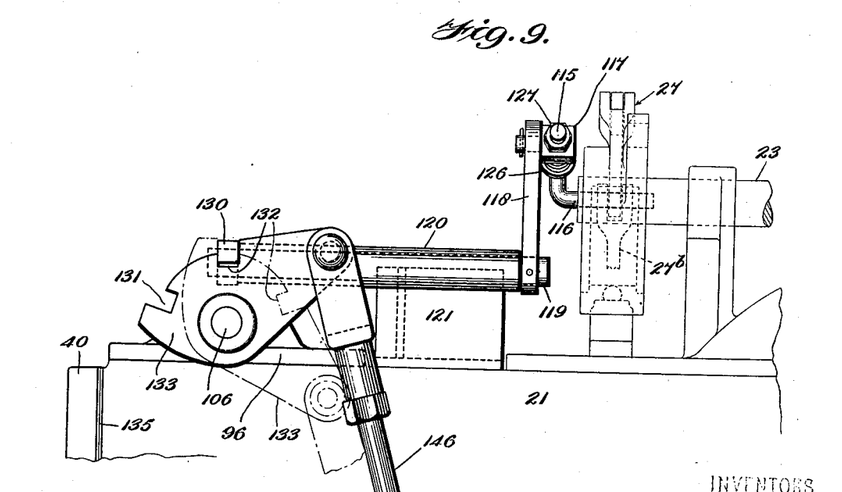
Fig. 9 is an elevational view of the parts shown in Fig. 8, as seen from the left of said figure.

When the shift has been completed, the clutch control lever 22 may be either returned to the position from which it was moved, to re-engage the clutch of the Hilkemeier mechanism which had been previously engaged, thereby continuing the rotation of the drum 15 in the same direction but at a lower speed, or the said lever 22 and rock shaft 23 may be moved further in a clockwise direction, as viewed in Fig. 8, to engage the other Hilkemeier clutch, thereby reversing the drum rotation. In the first instance the link 27ᵃ of the brake control linkage will be returned to its full line position, while in the second case the said link will be moved to the dotted line position shown in said figure, but in either event the effect will be to return the arm 27ᵇ and the pivot extension 116 of rod 115 to the full line positions shown therein. The movement of the rod 115 toward the left will return the arm 118 and the dog 130 to their full line positions, the said dog however, engaging in the notch 131 of the locking plate 133 and again locking the rock shaft 106 against movement. The dog will seat in the notch prior to the completion of the movement of the rod 115, and the latter part of such movement will serve to again load the spring 125, as will be readily understood. The same sequence of movements will of course take place when it is desired to again shift the change speed gearing to "high" or direct drive.

Shims 135 are preferably provided between the plate 40 and the flange 39 of housing 21, and since the bearing housing 66 is slidable in the aperture 67 in the wall 35, by varying the number of shims employed, a proper meshing of the teeth of pinion 68 and gears 69 without backlash may be secured.

While in some instances the rock shaft 106 may be extended beyond the hub of the locking plate 133 and there provided with a hand lever by means of which it may be oscillated, it is preferred to locate such lever in the truck cab and to connect it by suitable linkage to the said plate 133, whereby shifting of the change speed gearing of the parent invention may be effected by the operator without leaving the cab. One such arrangement is illustrated in Figs. 1 and 2, wherein the lever 140 for actuating the change speed gearing extends upwardly through the floor of the truck cab 141 in front of the seat 142, being rigidly carried by a rock shaft 143 mounted in suitable bearings 144. The rear end of the said shaft rigidly carries an arm 145 which is connected by an upwardly extending link 146 to the locking plate 133. As will be readily understood, by shifting the lever 140 the rock shaft 106 may be actuated to shift the change speed gear mechanism from "high" to "low" and vice versa, as desired.

The machine shown in Fig. 1 is equipped with compressed air operated mechanism for controlling the reversing clutches of the prior Hilkemeier application. While such mechanism in itself constitutes no part of the present invention, it may be briefly described as comprising a fluid pressure operated actuator or motive device 150 having an actuator arm or lever 151 connected by a link 152 to the lever 22 which controls the reversing clutches. The motive device 150 is controlled by suitable valves contained within a housing 153, which valves are actuated by means of a lever 154. A link 155 connects this lever with a hand lever 156 mounted at the rear of the machine, whereby the rotation of the drum, and the direction thereof, may be controlled from this point. Such movements of the drum may also be controlled from the truck cab 141 by means of a push-pull rod 157, which is connected through rock levers 158 and 159, and links 160 and 161, to the valve control arm 154. Obviously, by extending the rock shaft 143 to the rear of the machine, control of the change speed gearing may also be effected from that point if desired.

While one form of the invention has been illustrated and described, it will be obvious that those skilled in the art may vary the precise details of construction and arrangement of parts without departing from the spirit of the invention, and therefore it is not wished to be limited to the above disclosure, except as may be required by the following claims.

What is claimed is:

1. In a device for shifting and controlling a clutch or like mechanism, a shifting member engageable with a portion of said mechanism; a pair of arms mounted one to either side of a portion of said shifting member; a yielding connection between said member and each of said arms; and means for actuating and controlling said shifting member, comprising a cam mounted for engagement with a portion of each of said arms, whereby movements of the cam may be transmitted through said arms and yielding connections to the shifting member to cause a change of position of the mechanism controlled thereby, said cam also acting to spread the arms relative to one another against the action of said yielding means upon movement of the parts from a predetermined position of the controlled mechanism, whereby reaction of the yielding means and arms will cause the parts to seek and tend to maintain such predetermined position of the mechanism.

2. In a shifting and controlling device for a clutch or like mechanism, a shifting member engageable with a portion of said mechanism; a pair of opposed arms mounted one to either side of a portion of said member; a resilient connection between the member and each of said arms; and means for actuating and controlling said shifting member, comprising an arcuately movable cam mounted between and engageable by a portion of each of the arms, whereby motion of the cam may be transmitted through the arms and resilient connections to the shifting member to change the condition of the mechanism controlled thereby, said cam having angularly disposed portions of unequal dimensions, the greater of which is positioned to spread the arms relative to one another against the action of said resilient means upon movement of the parts from a predetermined position of the controlled mechanism, whereby the reaction of the resilient means in causing the arms to seek the lesser dimension of the cam will produce in the parts a constant tendency to seek and maintain such predetermined position.

3. Shifting and controlling mechanism for a clutch or the like, comprising a shifting member; a pair of arms mounted one to either side of said member; a yielding connection between said member and each of said arms; and a single cam means for shifting the arms and member to change the condition of the means controlled by the shifting member, and in conjunction with the arms and yielding connections producing a bias of the parts toward a predetermined condition of the controlled means.

4. Clutch shifting mechanism, comprising a pivotally mounted shifting member; a pair of independently pivotally mounted arms engaging opposite sides of a portion of said shifting member, said arms being provided with a pair of opposed flat faces; preloaded spring means yieldably maintaining said engagement between the arms and shifting member portion; and an oscillatory cam member having opposed flat faces disposed to co-operate with said arm faces.

5. Clutch shifting mechanism, comprising a pivotally mounted shifting member; a pair of independently pivotally mounted arms engaging opposite sides of a portion of said shifting member, said arms being provided with a pair of opposed flat faces; preloaded spring means yieldably maintaining the engagement between said arms and shifting member portion; and a cam having a squared member disposed between said flat arm faces, and mounted to oscillate to alternately bring different pairs of its flat surfaces into engagement with said arm faces.

6. Clutch shifting mechanism, comprising a pivotally mounted shifting member; a pair of independently pivotally mounted arms engaging opposite sides of a portion of said shifting member, said arms being provided with a pair of opposed flat faces; preloaded spring means yieldably maintaining the engagement between said arms and shifting member; and an oscillatory cam including an eccentrically arranged squared projecting element disposed between said flat arm faces and adapted upon oscillation to bring different opposed flat faces thereof into engagement with said arm faces.

7. Clutch shifting mechanism, comprising a pivotally mounted shifting member having a lug provided with a pair of apertures therethrough; a pair of arms pivotally mounted co-axially with but independently of said shifting member, and having portions engaging opposite sides of said lug, said arms also being provided with a pair of opposed flat faces; a bolt carried by each arm, extending through said lug apertures; a preloaded spring mounted on each bolt, yieldably urging its arm toward said lug; and an oscillatory cam including an eccentrically mounted squared projection disposed between said arm faces and adapted upon oscillation to bring different opposed flat faces thereof into engagement with said arm faces.

8. Clutch shifting mechanism, comprising a pivotally mounted shifting member; a pair of independently pivotally mounted arms engaging opposite sides of a portion of said shifting member, said arms being provided with a pair of opposed flat faces; a cam for oscillating said arms and shifting member, including a squared projection disposed between said flat arm faces and movable between two positions in each of which an opposed pair of its flat surfaces is in flat engagement with said arm faces; and spring means constantly tending to maintain such flat engagement in either position, thereby resisting unintentional movement of the cam and shifting member.

CHARLES F. BALL.
LOUIS G. HILKEMEIER.